United States Patent
Ouyoung

(10) Patent No.: US 6,776,310 B2
(45) Date of Patent: Aug. 17, 2004

(54) SOAP DISPENSER HEAD

(75) Inventor: Scott Ouyoung, Taichung (TW)

(73) Assignee: Globe Union Industrial Corp., Taichung Export Processing Zone (TW)

( * ) Notice: Subject to any disclaimer, the term of this patent is extended or adjusted under 35 U.S.C. 154(b) by 92 days.

(21) Appl. No.: 10/206,083

(22) Filed: Jul. 29, 2002

(65) Prior Publication Data

US 2004/0016775 A1 Jan. 29, 2004

(51) Int. Cl.[7] .................................................. G01F 11/06
(52) U.S. Cl. ............................... 222/321.3; 222/321.7; 222/518
(58) Field of Search ........................... 222/321.3, 321.7, 222/383.1, 518

(56) References Cited

U.S. PATENT DOCUMENTS

| | | | | |
|---|---|---|---|---|
| 1,187,474 A | * | 6/1916 | Hollingsworth | 222/181.2 |
| 4,479,593 A | * | 10/1984 | Bundschuh | 222/321.7 |
| 5,303,853 A | * | 4/1994 | Nye | 222/212 |
| 5,794,825 A | * | 8/1998 | Gordon et al. | 222/504 |
| 5,842,616 A | * | 12/1998 | Ruscitti et al. | 222/321.3 |
| 6,161,732 A | * | 12/2000 | Albini | 222/321.3 |

* cited by examiner

Primary Examiner—Joseph A. Kaufman
(74) Attorney, Agent, or Firm—Leong C. Lei

(57) ABSTRACT

An improved structure of a soap dispenser head to deliver a fixed amount of soap liquid and to prevent any leakage of soap liquid, essentially comprised of a graded trough on either side of a soap delivery head of a soap dispenser; a soap liquid inlet being provided on either side of the graded trough; a soap liquid outlet being provided at the bottom of the graded trough; a piston penetrating the graded trough, a cap being provided on the top of the graded trough, a ring seat being provided at the bottom of the piston ring of the piston; a coil being inserted on to the bottom of the ring seat, a stop being provided at the lower end of the piston; a retaining hole is provided at the lower end of the piston, a hole being provided on the stop for the retaining to penetrate through the stop and inserted into the retaining hole in the piston thus to position the stop in the lower end of the piston so that when the soap dispenser is depressed for the piston in the soap delivery head to move downward, the ring seat on the piston closes up the soap liquid inlet on either side of the graded trough of the soap delivery head to avoid continuous feeding of the soap liquid to deliver only a fixed amount of soap liquid while the sop completely closes up the soap liquid outlet once the piston returns to its original piston to prevent leakage of soap liquid.

1 Claim, 4 Drawing Sheets

SOAP DISPENSER HEAD

BACKGROUND OF THE INVENTION

(a) Field of the Invention

The present invention is related to an improved structure of a soap dispenser head, and more particularly to one that makes sure only a fixed amount of soap is dispensed without any leakage occurring.

(b) Description of the Prior Art

As modern technology advances, people demand more convenience in daily life. Taking the soap or other hand cleaning liquid for example, one does not have to hold the soap or cleaning lotion; instead, a mechanical soap dispenser delivers the soap liquid either by depressing it or by induction. However, in terms of the soap liquid itself, the internal structure of the soap dispenser is critical to the purpose of the soap dispenser in general. The structure of a patented soap dispenser is found with defectives that the amount of soap liquid delivered varies drastically and that it is vulnerable to leakage. The reason is that when the soap delivery head is delivering the soap liquid, the soap liquid inlet is not closed up at the same time. Therefore, while delivering the soap liquid, the soap liquid is continuously fed in, resulting in a variable amount of soap liquid delivered each time. Furthermore, the soap liquid outlet is closed up by a hole inside the soap delivery head, however, its passage connected outside the hole is not closed up at the same time, therefore, the residual soap liquid from the preceding delivery will leak and waste the soap.

SUMMARY OF THE INVENTION

The primary purpose of the present invention is to provide an improved structure for a soap dispenser head that always delivers a fixed amount of soap without leakage.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
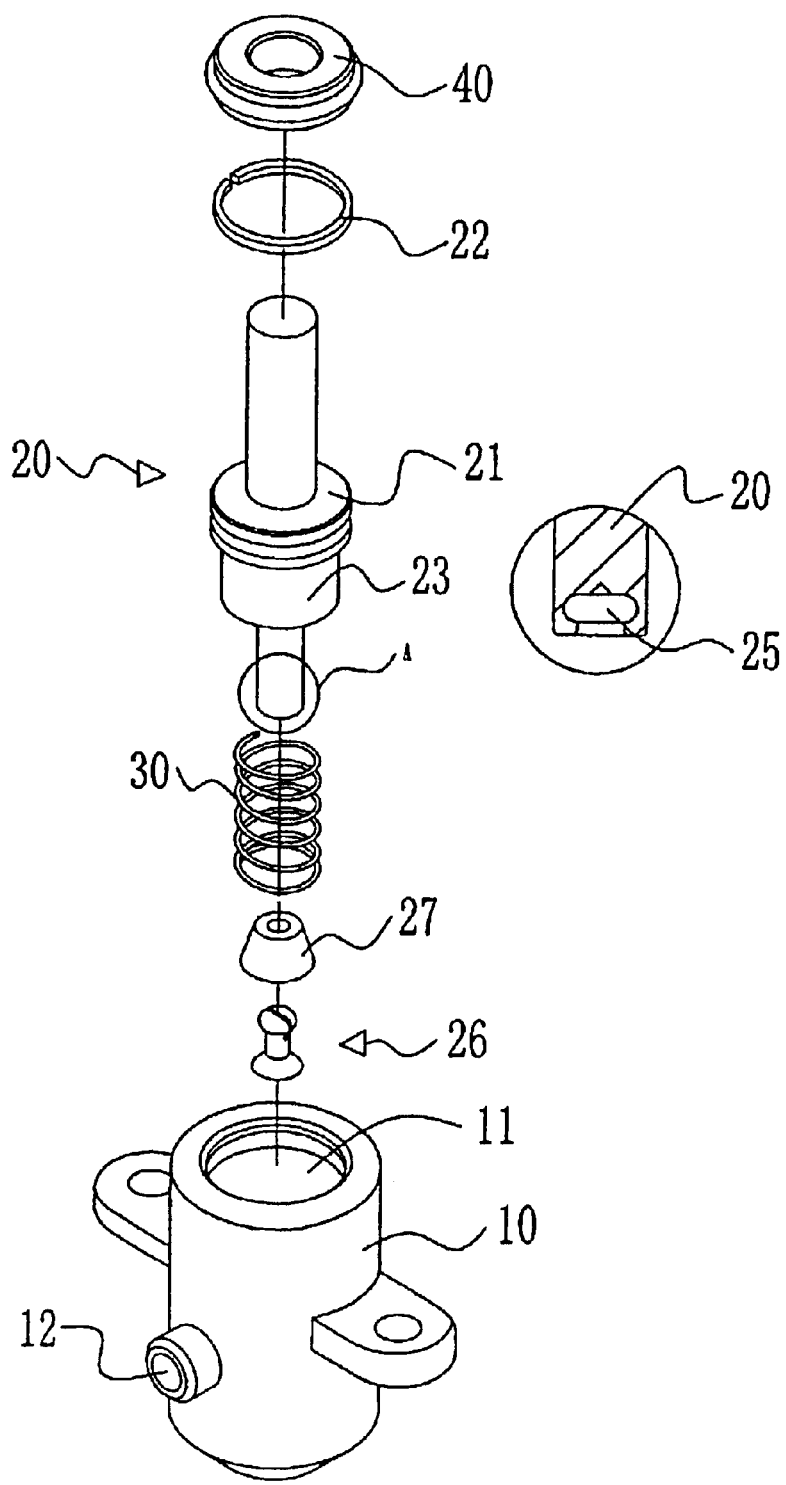
FIG. 1 is an exploded view of a preferred embodiment of the present invention.
Figure 2:
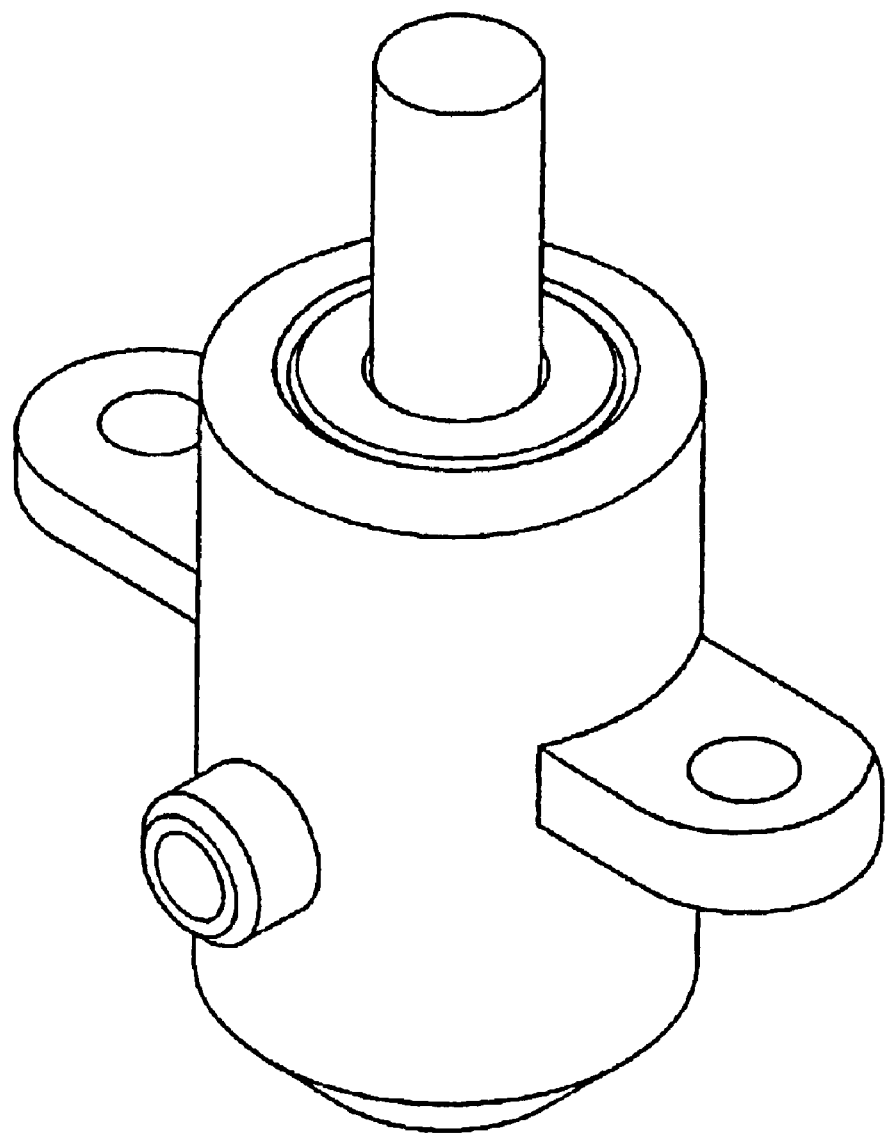
FIG. 2 is a view showing the appearance of the preferred embodiment of the present invention.
Figure 3:
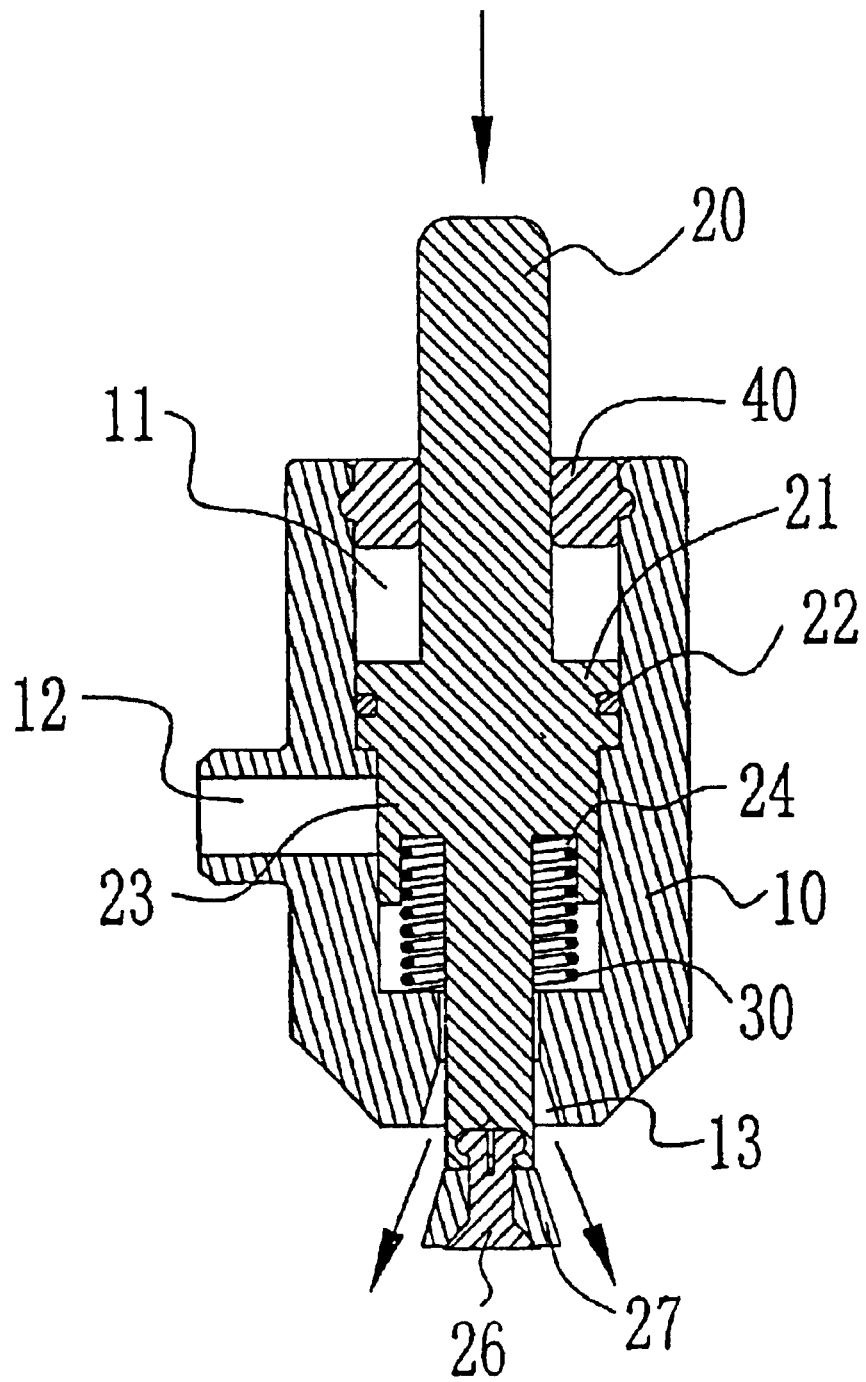
FIG. 3 is a schematic view showing the operation of a piston of the preferred embodiment of the present invention.
Figure 4:
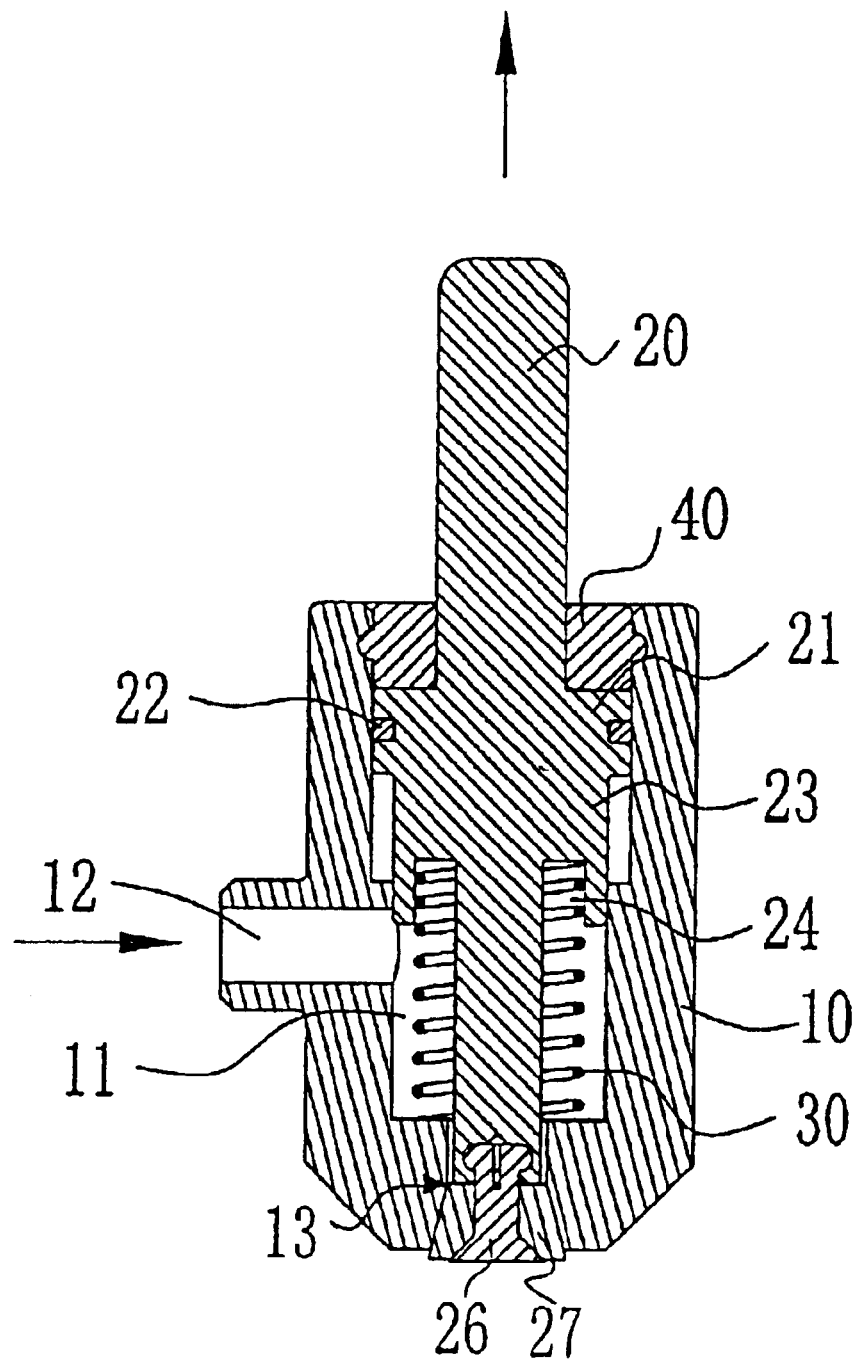
FIG. 4 is another schematic view showing the operation of the piston of the present invention.

Referring to FIGS. 1, 2, 3 and 4, the present invention is essentially comprised of a soap delivery head 10 containing a graded trough 11; a soap liquid inlet 12 is provided on either side on the outer surface of the soap delivery head 10 and a soap liquid outlet 13 in an increasingly expanded diameter is provided at the bottom of the graded trough 11. A piston 20 is inserted into the graded trough 11 with the middle section of piston 20 formed into a ring 21 in a larger outer diameter and a ring seat 23. A groove is provided on the peripheral of the piston ring 21 to allow insertion of a packing 22 and an inner ring groove 24 is provided on the bottom peripheral of the ring seat 23 to allow insertion of a coil 30 to surround the outer edge of the piston 20. A retaining hole 25 internally graded is provided at the lower end of the piston 20 to fix a retainer head 26 into the retaining hole 25. The retainer head 26 has a form resembling a rivet, wherein, a flap tip is provided on top of the retainer head 26 to permit retreating space when the tip is compressed by external force while making sure that the tip is forced in the retaining hole 25 while a skirt at the lower part of the retaining head 26 is provided to penetrate through a central hole in a stop 27, then to stay in position in the stop 27. Furthermore, a cap 40 containing a circular hole to receive the insertion of the upper portion of the piston 20 is provided on the upper circumference of the graded trough 11 in the soap delivery head 10.

The present invention is characterized by that in the course of delivering the soap solution by the soap delivery head 10, it is driven by the soap dispenser to exercise force onto the piston 20 in the soap delivery head 10, thus to press down the piston 20 while compressing the coil 30 for the stop 27 to move downward and away from the soap liquid outlet 13 to allow smooth delivery of soap liquid. Meanwhile, the ring seat 23 on the piston 20 closes up the soap liquid inlet 12 provided on either side of the graded trough 11 of the soap delivery head 10 thus to avoid continuous delivery of soap liquid, achieving the purpose of delivering a fixed amount of soap liquid each time the soap dispenser is depressed. Once the pressing of the soap dispenser stops, the piston 20 returns to its original position as rejected by the compression coil 30 to push the ring seat 23 of the piston 20 away from the soap liquid inlet 12, which is then opened again to continue feeding the soap liquid while the stop 27 at the bottom of the piston 20 completely closes up onto the outer circumference of the soap liquid outlet 30 to prevent leak of soap liquid.

As disclosed, the present invention provides the following advantages:

1. The continuous feeding of soap liquid is stopped to achieve the purpose of delivering a fixed amount of soap liquid each time the soap dispenser is depressed by means of the piston ring seat closing up the soap liquid inlet whenever the piston is forced to move downward.

2. The soap dispenser is leak proof thanks to the design of the stop to the piston in the soap delivery head to completely and inwardly close up the entire soap delivery outlet when the piston moves up to return to its original position.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of a soap dispenser head for delivering a fixed amount of soap liquid and to prevent any leakage of soap liquid, comprising a soap delivery head having a graded trough, a soap liquid inlet provided on a side of the graded trough, a soap liquid outlet provided at a bottom of the graded trough, a piston penetrating the graded trough, a middle section of the piston being provided with a ring in a larger outer diameter to receive a packing, and a cap provided on a top of the graded trough, the soap liquid outlet having an increasingly expanded diameter, a ring seat provided at a bottom of the ring, a coil fitted in a bottom of the ring seat, a stop provided at a lower end of the piston so that when the piston is depressed to go downwardly, the ring seat will close the soap liquid inlet on the graded trough to deliver a fixed amount of soap liquid while the stop completely closes up the soap liquid outlet once the piston returns to an original position there preventing leakage of soap liquid.

* * * * *